(12) United States Patent
Sen et al.

(10) Patent No.: US 11,341,697 B2
(45) Date of Patent: May 24, 2022

(54) SYSTEM AND METHODS FOR RESOLVING AUDIO CONFLICTS IN EXTENDED REALITY ENVIRONMENTS

(71) Applicant: Rovi Guides, Inc., San Jose, CA (US)

(72) Inventors: Susanto Sen, Karnataka (IN); Ankur Anil Aher, Maharashtra (IN)

(73) Assignee: Rovi Guides, Inc., San Jose, CA (US)

( * ) Notice: Subject to any disclaimer, the term of this patent is extended or adjusted under 35 U.S.C. 154(b) by 147 days.

(21) Appl. No.: 16/917,853

(22) Filed: Jun. 30, 2020

(65) Prior Publication Data

US 2021/0407158 A1    Dec. 30, 2021

(51) Int. Cl.
| | | |
|---|---|---|
| *G06T 11/60* | (2006.01) | |
| *G10L 21/10* | (2013.01) | |
| *G10L 15/26* | (2006.01) | |
| *G10L 15/22* | (2006.01) | |

(52) U.S. Cl.
CPC .............. *G06T 11/60* (2013.01); *G10L 15/22* (2013.01); *G10L 15/26* (2013.01); *G10L 21/10* (2013.01)

(58) Field of Classification Search
CPC ......... G06T 11/60; G10L 15/22; G10L 15/26; G10L 21/10
USPC .......................................................... 345/636
See application file for complete search history.

(56) References Cited

U.S. PATENT DOCUMENTS

| | | | | |
|---|---|---|---|---|
| 9,600,227 | B2 * | 3/2017 | P.V. .......................... | G06F 3/167 |
| 2020/0007679 | A1 * | 1/2020 | Engelke .................. | G10L 25/60 |

* cited by examiner

*Primary Examiner* — Thomas J Lett
(74) *Attorney, Agent, or Firm* — Haley Giuliano LLP

(57) ABSTRACT

Systems and methods for resolving audio conflicts in extended reality systems. When multiple users speak at the same time, one user is selected to speak to the others. The audio output of each remaining speaker is not broadcast, but is instead converted to text which is displayed next to each speaker's avatar or other representation. Users are thus no longer subjected to confusion when multiple speakers each attempt to speak at the same time. Text may be displayed as an extended reality object that can be displayed in the proper perspective and orientation for each user. Displayed text may also be an interactive element of the extended reality environment, moving to avoid collisions with other elements or objects of the extended reality environment, capable of being manipulated by users, or the like.

20 Claims, 5 Drawing Sheets

SYSTEM AND METHODS FOR RESOLVING AUDIO CONFLICTS IN EXTENDED REALITY ENVIRONMENTS

BACKGROUND

The present disclosure relates generally to extended reality. More specifically, the present disclosure relates to systems and methods for resolving audio conflicts in extended reality environments.

SUMMARY

Immersive visual technologies have been developed to envelop users in an at least partially virtual environment. Such technologies, which can be referred to as extended reality technologies, include virtual reality (VR), augmented reality (AR), and mixed reality (MR) technologies. VR systems immerse users in a fully digital or virtual environment, typically employing a headset or head-mounted display to present users with a 360-degree view of a completely virtual or simulated environment, sometimes referred to as a virtual world. In contrast, AR systems overlay virtual information and objects on a view of the physical world, also typically via a head-mounted display, to enhance the real world. Somewhat related to AR systems, MR or hybrid reality systems overlay virtual objects on a view of the real world, where users may interact with these virtual objects in similar manner to physical objects in the real world, e.g., by "touching" them to open them up, move them, or the like.

Extended reality technologies suffer from drawbacks, however. For example, while multiple users may be able to interact with each other within the same extended reality environment, such as via their avatars or virtual representations, the same potential for voice conflict exists as in the real world. For example, two or more individuals attempting to talk at the same time may still be difficult for other listeners to understand.

Accordingly, to overcome the limited ability of computer-based extended reality systems to resolve conflicting audio communications, systems and methods are described herein for a computer-based process that resolves such audio conflicts by broadcasting the audio of one speaker while transcribing the audio of any concurrent speakers into text, and displaying the text for all users. That is, in case of multiple users attempting to speak at the same time, one speaker is chosen for broadcast of his or her audio, while the audio of the remaining speakers is muted and instead converted to text that is displayed for all users to see. In this manner, users hear only one person at a time, instead of being forced to listen to a cacophony of voices that can be difficult to understand and acknowledge. The remaining people attempting to speak have their words converted to text, which is displayed next to their avatars or virtual representations, such as in chat bubbles.

In some embodiments of the disclosure, an extended reality system may receive audio signals from multiple sources simultaneously, representing multiple users, each with their own avatar in the extended reality environment and each attempting to speak at the same time. The system selects one of these audio signals, i.e., one of the speaking users, as the user whose voice will be heard by the remaining users. This user's audio signal is then transmitted to each of the other users, allowing them to hear the selected user as he or she speaks. The other audio signals are not transmitted to users. Instead, they are each transcribed into text and transmitted for display next to each corresponding user's avatar. That is, the remaining speakers are silenced, and other users may perceive their words only in text form that is displayed next to the corresponding speakers' avatars.

Converted text may be displayed in any format suitable for perception by others. As one example, text may be displayed as extended reality objects positioned next to each speaker's avatar. This object may take any form, such as a chat bubble that associates speakers with the corresponding text of their uttered words.

Such extended reality objects may be any virtual image generated in an extended reality environment and capable of displaying text perceptible by users. The objects may be oriented and positioned in any manner. For example, objects may be generated for each user, to face that user in their perspective view. That is, when a user speaks, a corresponding chat bubble may be generated for every other viewer, where each chat bubble is oriented to face its viewer. Thus, when a speaker's voice is converted to text, each other user sees a chat bubble of that text, which is oriented to face that user. In this manner, voice text is displayed to face each user, i.e., each avatar sees its own chat bubble oriented to face that avatar.

Extended reality objects of embodiments of the disclosure may also be constructed such that they interact with their extended reality environment. Any such interactions are contemplated. As one example, extended reality systems may move objects to avoid collisions with other objects, or with elements of the extended reality environment. For instance, chat bubbles of avatars whose users are currently speaking may move with their avatar. As avatars move, their chat bubbles may risk intersection or collision with other objects in the extended reality environment. Accordingly, extended reality systems of embodiments of the disclosure may move the chat bubbles to avoid collisions. In this manner, as an avatar moves within its extended reality environment, their chat bubble may not only move with them, but may also move out of the way of other objects to avoid collisions with those objects. Thus, for example, chat bubbles may move upward to avoid low-lying objects that their avatar walks past, then return to their original position once the objects have been passed, all the while remaining positioned proximate to their avatar.

As above, extended reality systems of some embodiments of the disclosure may resolve audio conflicts, e.g., situations in which multiple speakers speak at the same time, by allowing one speaker's voice to be heard by the remaining users, and converting all other simultaneous conversation to text displayed next to the speakers' avatars. Systems of some embodiments of the disclosure may select the speaker whose voice is to be heard, in any manner. For instance, when simultaneous conversations are detected, the first speaker, corresponding to the first audio signal received, may be selected, and the remaining speakers may then be muted as their audio signals are received and converted to text.

Alternatively, speakers may be chosen by assigned priority level. In some embodiments, each speaker or each audio source may be assigned a priority level, where in the event of simultaneously received audio streams, the audio source with the highest priority level is chosen. Priority may be assigned in any suitable manner. For instance, in workplace environments, priority levels may be assigned to users according to position within the organization or workplace. Similarly, one or more moderators or extended reality session organizers may be pre-designated as having a higher priority level, and thus being able to moderate any audio conflicts. As another example, priority may rotate between speakers, with those not having had a chance to speak for some time being assigned a higher priority level to allow every user a more equitable chance to speak over time.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for resolving audio conflicts in extended reality systems. When more than one user speaks at the same time, systems of some embodiments of the disclosure designate one user to speak. The audio output of each remaining speaker is not broadcast, but is instead converted to text, which is displayed next to each speaker's avatar or other representation. Users are thus no longer subject to confusion when multiple speakers each attempt to speak at the same time. Instead, only a single user's speech is broadcast, with the speech of the remaining users instead displayed as text. This text may be displayed as an extended reality object that can be displayed in the proper perspective and orientation for each user to see. Displayed text may also be an interactive element of the extended reality environment, moving to avoid collisions with other elements or objects of the extended reality environment, capable of being manipulated by users, or the like.

Figure 1:
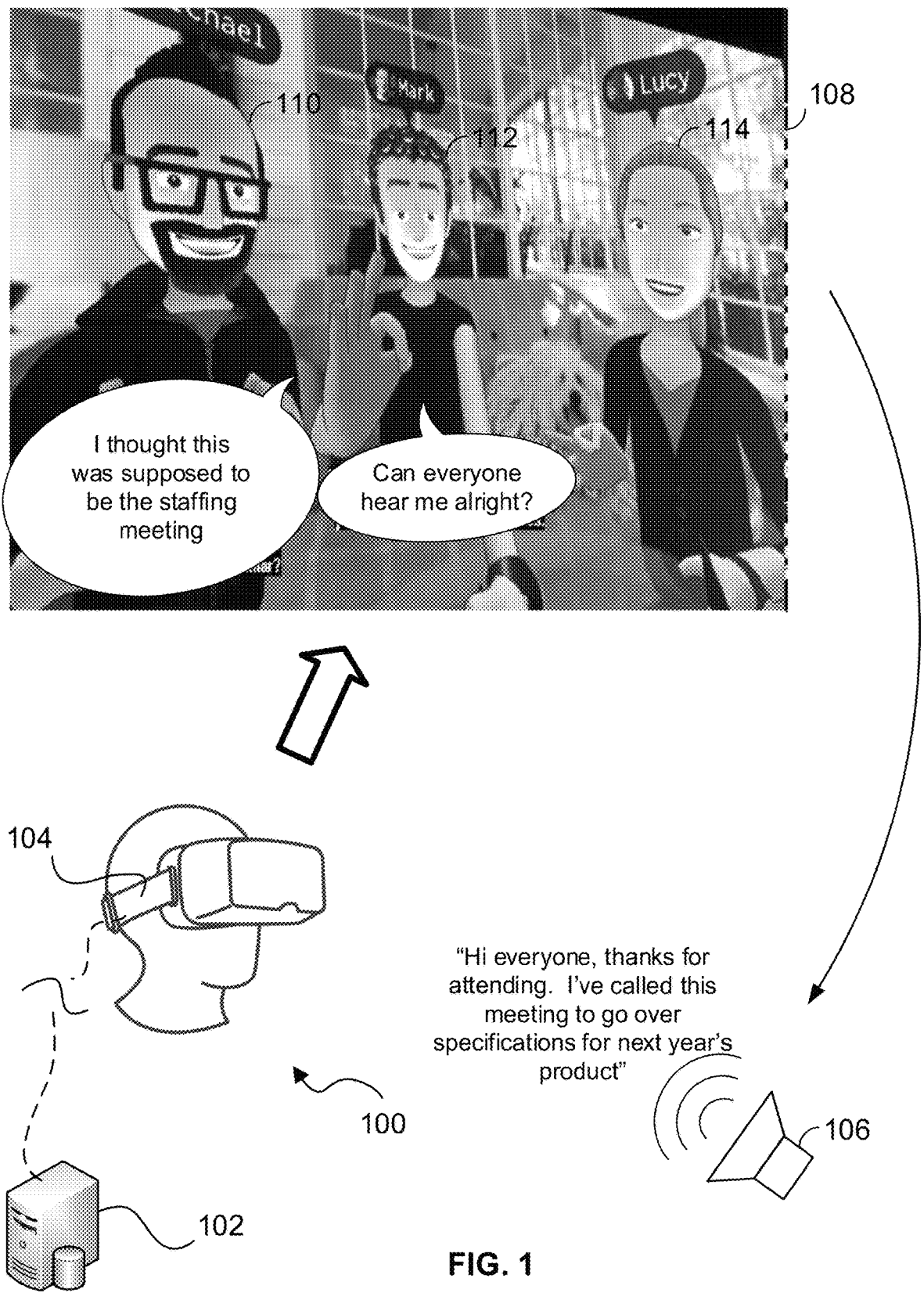
FIG. 1 conceptually illustrates operation of an exemplary system for resolving audio conflicts in extended reality environments, in accordance with some embodiments of the disclosure.

FIG. 1 conceptually illustrates operation of an exemplary system for resolving audio conflicts in extended reality environments, in accordance with some embodiments of the disclosure. Here, an extended reality system 100 includes a server 102 or other computer, in electronic communication with a head-mounted display 104. Server 102 generates one or more elements of a virtual environment and transmits these elements for display by head-mounted display 104 to the user. In particular, head-mounted display 104 projects images to generate a generally three-dimensional environment 108 for immersing the user within. In particular, the user's view of environment 108 changes as the user moves his or her head, simulating the physical world. The environment 108 may include portions of the physical world, or may be a completely virtual environment, depending on whether the system 100 is a VR, MR, or AR system.

The environment 108 may also include one or more avatars 110, 112, 114, or virtual representations of other users. Each other user may have a similar system 100 whose server 102 is in electronic communication with the servers 102 of the other users, so that avatars 110, 112, 114 of each user are generated for display as appropriate within the environment 108 of each other user. Each system 100 may also include a speaker 106 in electronic communication with its respective server 102 for transmitting sounds uttered by the other users. In similar manner, each system 100 may include a microphone (not shown) in electronic communication with server 102 and configured for detecting and relaying user sounds to each other user. The microphone and/or speaker 106 may be incorporated into head-mounted display 104, or may alternatively be stand-alone devices positioned within audible range of head-mounted display 104.

In operation, system 100 displays extended reality environment 108 for its user, containing a number of avatars 110, 112, 114 each representing another user. When an audio conflict occurs, such as when the user of each avatar 110, 112, 114 speaks at the same time, one or more servers 102 select the audio signal from one user for broadcast by speakers 106 and convert the remaining audio signals to text that is displayed as chat bubbles pinned to the corresponding avatar 110, 112, 114. For example, as shown in FIG. 1, the user corresponding to avatar 114 may be selected as the speaker whose voice is projected by speakers 106, while the users corresponding to avatars 110 and 112 may then have their voices converted to text and displayed as chat bubbles associated with their respective avatars 110, 112. Thus, while all three users may be speaking at the same time, users hear only the voice of avatar 114, discussing the purpose of the extended reality meeting. While the voices corresponding to avatars 110 and 112 are also speaking, in this case to ask whether they are in the correct meeting and whether they can be heard, respectively, other users only see the transcribed text of their speech and do not actually hear them. In this manner, users do not hear three different voices attempting to talk over each other at the same time, instead hearing only one voice and seeing text of the other two.

Some embodiments of the disclosure contemplate any form of text display. In particular, while text display is shown in FIG. 1 as occurring via chat bubbles, systems 100 may display text as any extended reality objects. As shown in environment 108, server 102 generates each text bubble as pinned to the avatar 110, 112 of the user who uttered those words, and facing the user of head-mounted display 104. That is, each system 100 generates text that faces its user in the environment 108 generated for that user. In some embodiments of the disclosure, text objects may move with their associated avatars 110, 112, so that generated text continues to face the user of head-mounted display 104 as that user moves or the avatars 110, 112 move within extended reality environment 108. Thus, when multiple users are present, the system 100 of each user generates an environment 108 in which the text of each speaker faces that user.

Figure 2A:
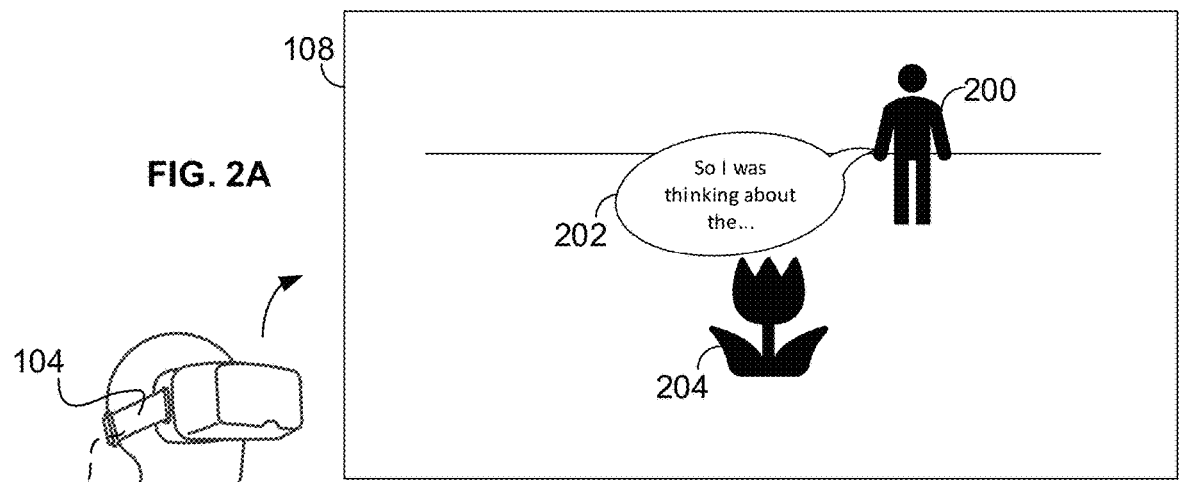
FIGS. 2A-2C conceptually illustrate collision avoidance of extended reality objects displayed, in accordance with some embodiments of the disclosure.
Figure 2B:
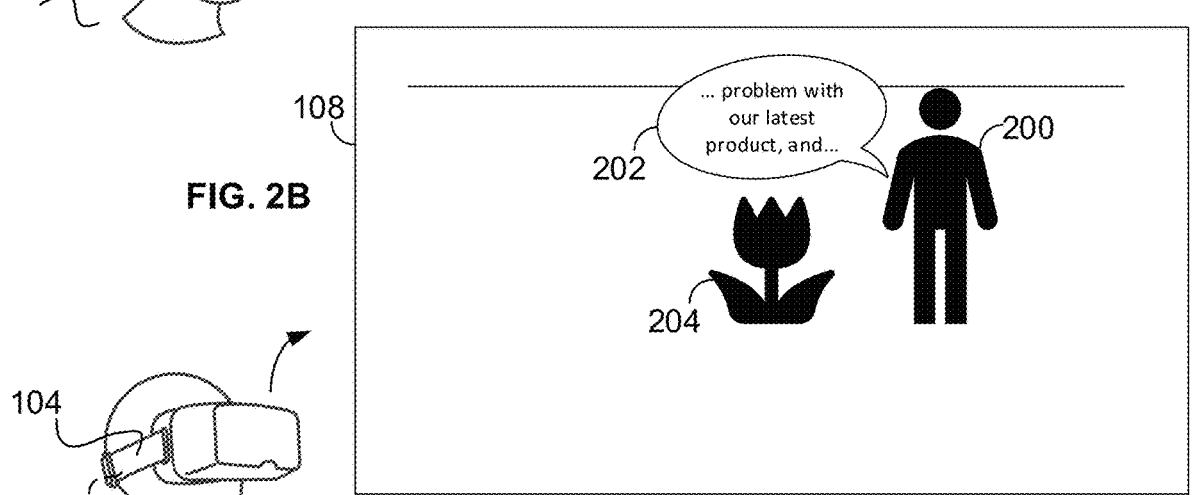
Figure 2C:
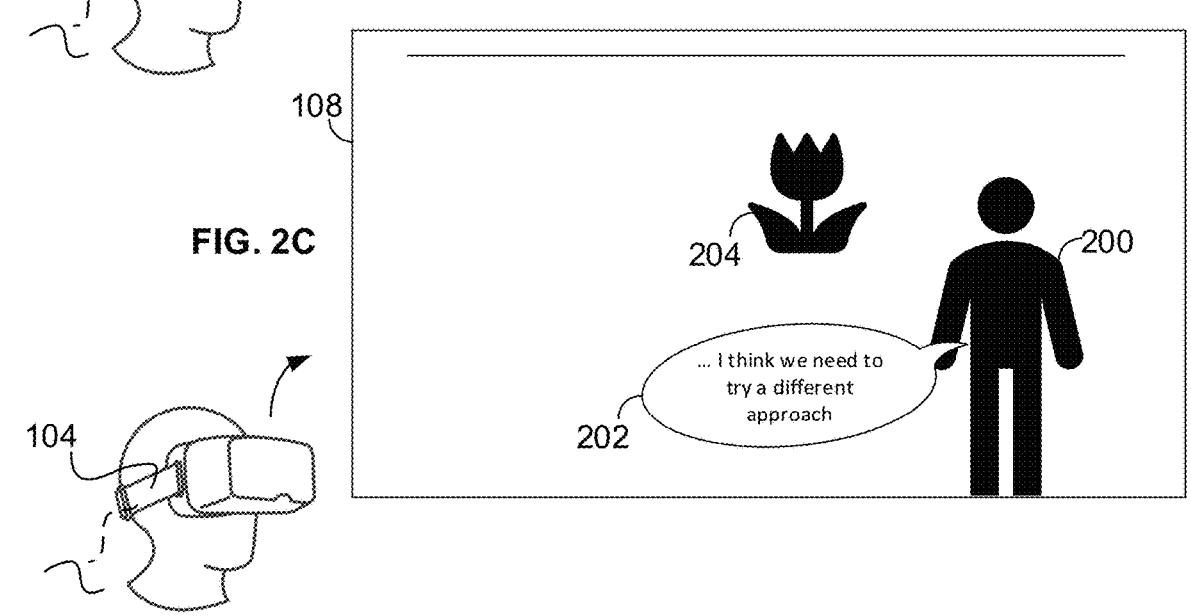

Some embodiments of the disclosure also contemplate use of extended reality objects that move relative to their associated avatars, such as to avoid collisions with any other extended reality elements. FIGS. 2A-2C conceptually illustrate collision avoidance of extended reality objects displayed in accordance with some embodiments of the disclosure. More specifically, FIGS. 2A-2C illustrate a sequence in which a chat bubble moves so as to avoid collision with another object while its avatar walks within the extended reality environment. Initially, as shown in FIG. 2A, an avatar 200 is walking or otherwise moving toward the viewer, i.e., toward the user of head-mounted display 104. The user of avatar 200 is also currently speaking, with his or her speech being transcribed into text that is displayed as a chat bubble 202. The chat bubble 202 is positioned near the lower half of the avatar 200, near the virtual ground. As can be seen from FIG. 2A, the chat bubble 202 may intersect the object 204 (in this case, a flower) in virtual environment 108 if the avatar 200 continues to walk toward the user of head-mounted display 104. Accordingly, as shown in FIG. 2B, when the system 100 detects a collision or imminent collision between the chat bubble 202 and another object such as object 204, the chat bubble 202 is moved so as to avoid intersecting the object 204. In the case shown, chat bubble 202 is raised above object 204, to be positioned alongside the upper half of avatar 200. Once the avatar 200 moves past the object 204, system 100 returns the chat bubble 202 to its original position relative to avatar 200, as in FIG. 2C. Collision avoidance is not limited to chat bubbles and may be performed with any object, and in particular any extended reality object containing text.

Embodiments of the disclosure may perform collision avoidance in any manner. For example, extended reality objects in three-dimensional space, such as chat bubbles, may be assigned spatial dimensions and collisions with other nonzero-size spatial objects may be detected according to known collision detection methods. Text-containing objects may be moved so that collision no longer occurs, according to any methods such as by translating these objects in a particular direction, e.g., upward from the perspective of the viewer, switching the text-containing objects to the opposite side of their avatar 200, shrinking the text-containing object, or the like. Any movement or alteration of text-containing objects sufficient to prevent or avoid collision is contemplated.

Figure 3:
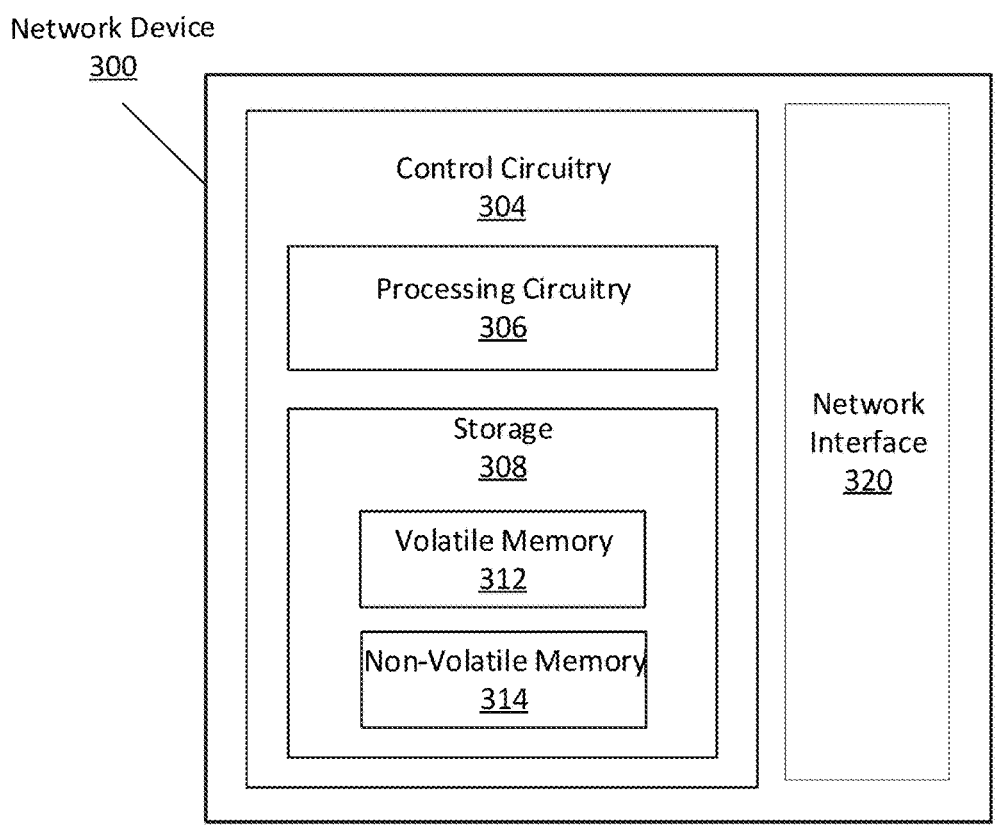
FIG. 3 is a block diagram of an illustrative device in a system for resolving audio conflicts in extended reality environments, in accordance with some embodiments of the disclosure.

FIG. 3 shows an illustrative block diagram of a device 300 in an extended reality system, according to some embodiments of the disclosure. Device 300 in an extended reality system may include one or more servers (e.g., server 102 of FIG. 1) for generating, displaying, and/or managing an extended reality environment, including audio conflict resolution, transmitted over a computer network to end-user multi-perspective devices (e.g., devices 104 of FIGS. 1-2C). Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 320 may be used to communicate with other devices in a network system (e.g., between devices 104 and across internet 410 of FIG. 4).

In some embodiments, control circuitry 304 executes instructions for execution of extended reality content generation and/or processing functions stored in memory (i.e., storage 308). The instructions may be stored in either a non-volatile memory 314 and/or a volatile memory 312 and loaded into processing circuitry 306 at the time of execution. A system for generating and processing extended reality content (e.g., the systems described in reference to FIGS. 1-2C) may be a stand-alone application implemented on a user device (e.g., end-user device 104) and/or a server (e.g., device 400) or distributed across multiple devices in accordance with device 300. The system may be implemented as software or a set of executable instructions. The instructions for performing any of the embodiments discussed herein of extended reality processing may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes described herein may be stored in storage 308 and executed by control circuitry 304 of device 300.

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the end-user devices 104. Circuitry 304 may also include digital-to-analog converter circuitry and analog-to-digital converter circuitry for converting between digital and analog signals. The tuning and encoding circuitry may be used to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, functions for incorporating video or other recordings of physical environments, multiple-tuner recording, etc.). If storage 308 is provided as a separate device from device 300, the tuning and encoding circuitry (including multiple tuners) may be associated with storage 308. Device 300 may be a central device in communication with each device 104. Alternatively, device 300 may correspond to device 104, that is, each system 100 may not have its own device 104, but rather a single central device 300 may carry out extended reality environment generation and audio conflict resolution processes for every system 100.

Figure 4:
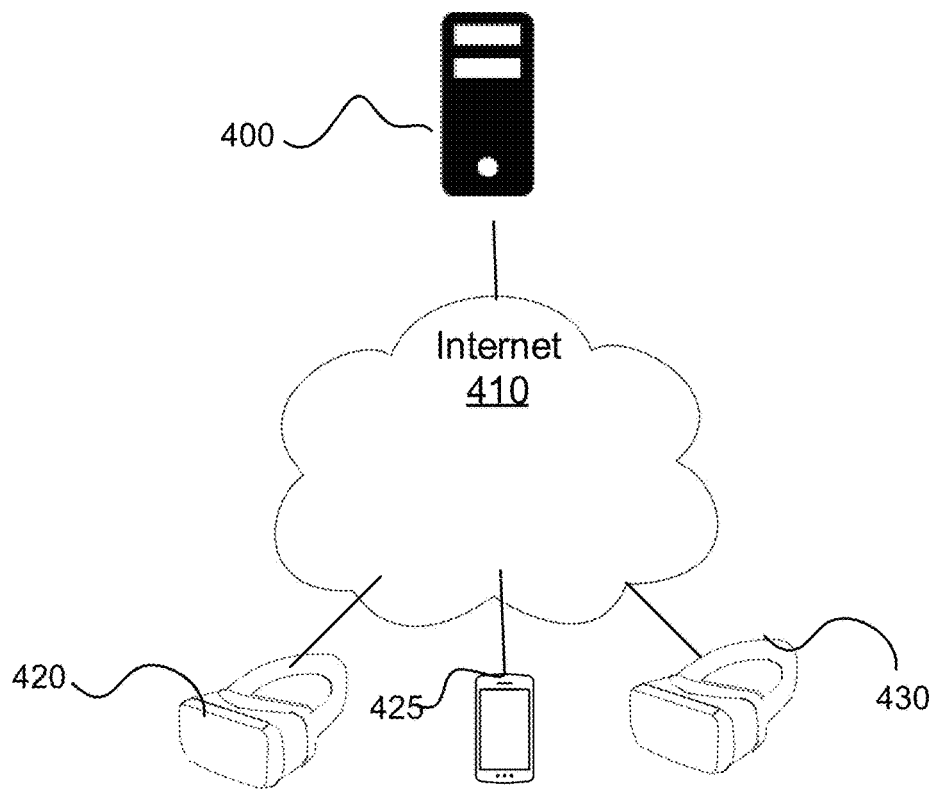
FIG. 4 is a block diagram of an illustrative system for resolving audio conflicts in extended reality environments, in accordance with some embodiments of the disclosure.

FIG. 4 shows an illustrative block diagram of an extended reality content system according to some embodiments of the disclosure. At least one extended reality content server 400 generates extended reality content, such as that described herein. Extended reality content server 400 transmits the content over internet 410 to multiple end-user devices including devices 420, 425, 430. End-user extended reality devices may include, for example, personal computers, mobile devices (e.g., smart phones), and/or wearable devices including extended reality headsets, goggles, suits, gloves, etc., configured to present and allow interaction with extended reality environments. These devices are configured to allow an operator/user to view and interact with multi-user extended reality content. These devices may provide, for example, visual, audio, and haptic feedback that presents the perspectives and attention-directing cues such as described herein. End-user devices 420, 425, 430 also transmit data to server 400 via internet 410, where such data includes orientation information indicating the direction the devices 420, 425, 430 are facing (and thus the view that server 400 must generate for display on each device 420, 425, 430), audio signals detected by each device 420, 425, 430, and user input such as selections of extended reality objects. Server 400 then generates a view of the extended reality environment for each device 420, 425, 430.

Figure 5:
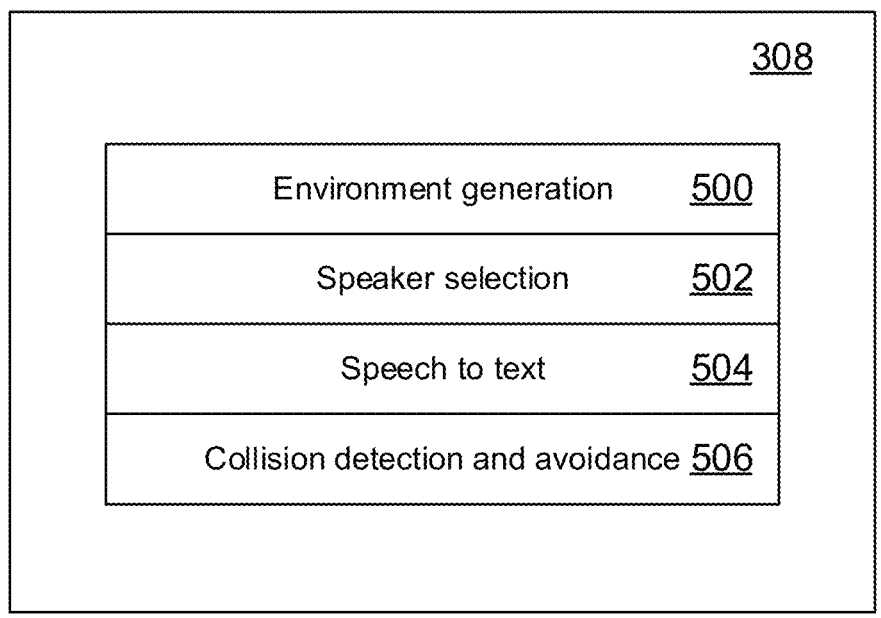
FIG. 5 is a block diagram of instruction modules stored in the storage of the device of FIG. 3, in accordance with some embodiments of the disclosure.

FIG. 5 is a block diagram of instruction modules stored in the storage of the device of FIG. 3, in accordance with some embodiments of the disclosure. The instructions stored in storage 308 may include any number of instruction or code modules for executing processes of some embodiments of the disclosure. In some embodiments, the instruction modules include an environment generation module 500 for generating the extended reality environment transmitted to and displayed by each device 420, 425, 430, as well as a speaker selection module 502 for selecting an audio stream from among conflicting or simultaneously received audio streams, according to the above-described criteria. The instruction modules also include a speech-to-text module 504 implementing known speech-to-text methods and processes for transcribing audio streams into text for display by environment generation module 500, as well as a collision detection and avoidance module 506 for detecting and preventing collisions between displayed text objects and other extended reality environment objects as described above in connection with FIGS. 2A-2C.

Figure 6:
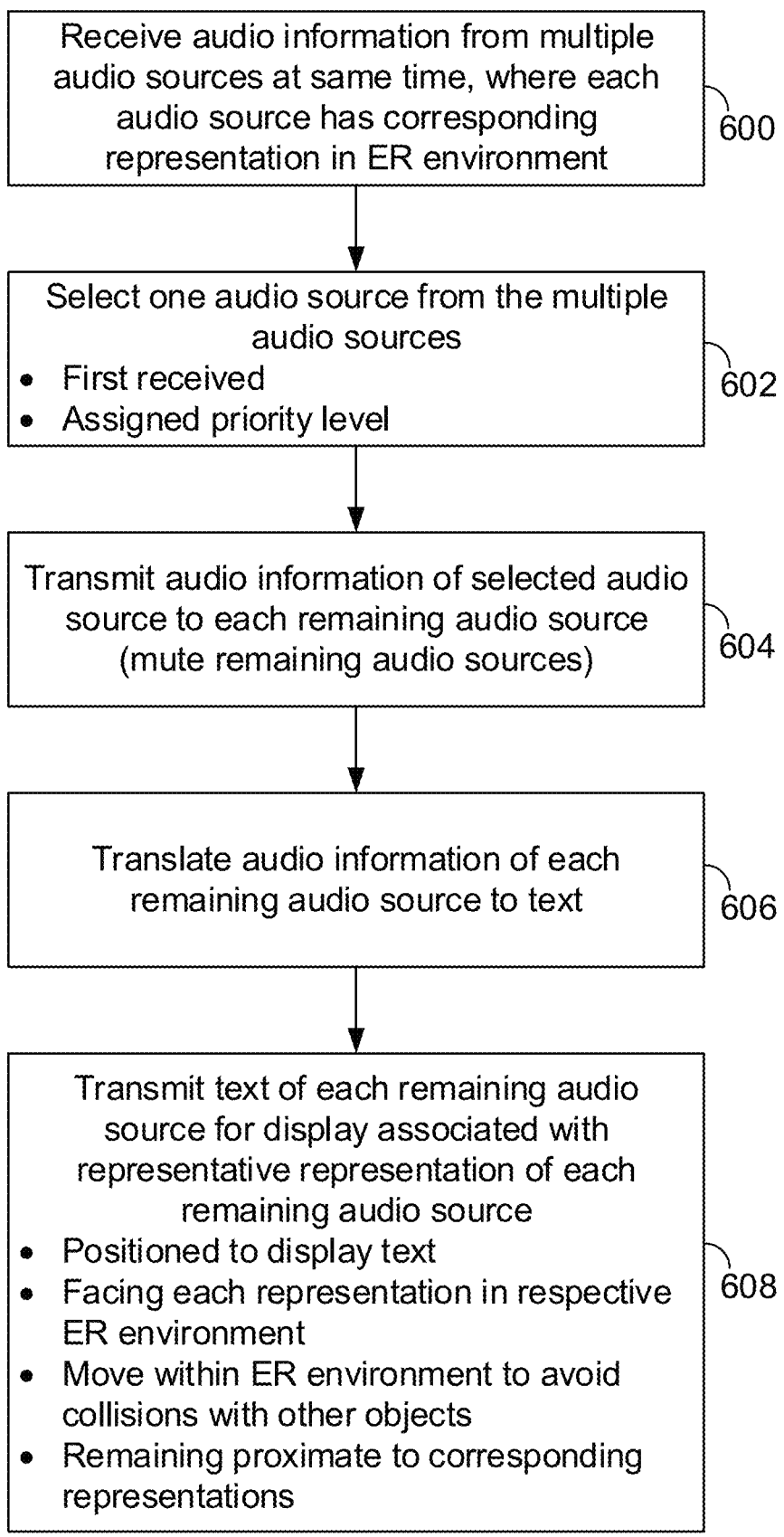
FIG. 6 is an illustrative flowchart of a process for resolving audio conflicts in extended reality environments, in accordance with some embodiments of the disclosure.

FIG. 6 is an illustrative flowchart of a process for resolving audio conflicts in extended reality environments, in accordance with some embodiments of the disclosure. Initially, a set of users may be placed into the same extended reality environment. Placement may occur in any manner, such as by selection of the same environment by each user, by server 400 selecting users according to geographic proximity (either real world or virtual world proximity), selection or clustering of users according to user preference or any one or more criteria thereof, or the like. User selection may be, for example, performed according to any user preferences, such as a user-expressed or otherwise determined preference for selection according to any demographic characteristic like education, profession, region, or interest.

Once a set of users is placed within the same extended reality environment, content server 400 may receive audio information from multiple audio sources at the same time, where each audio source has a corresponding representation in an extended reality environment (Step 600). That is, server 400 receives audio streams from each user (e.g., each device 420, 425, 430) that is speaking.

As above, each device 420, 425, 430 may transmit detected speech of its respective user to server 400 as, e.g., an audio stream. When server 400 receives more than one such stream at the same time, speaker selection module 502 of server 400 selects one of the streams, i.e., one audio source, as the stream to be broadcast to each other device 420, 425, 430 (Step 602). As previously described, selection may be performed according to any one or more criteria, including the first stream to be received (e.g., the first user to speak); detected speech volume (e.g., the loudest user gets to speak); geographic proximity to a particular point within either the real world or the extended reality environment (e.g., the user nearest to a meeting or a particular other user); particular detected speech details such as particular keywords uttered; assigning of a priority level to each device 420, 425,430 and selection of the device 420, 425, 430 having highest assigned priority; or the like. In the event of multiple simultaneous speakers having the same assigned priority level, server 400 may select one such speaker in any manner, such as by selecting the first of the highest-priority users to speak, selecting one of the highest-priority speakers at random, or the like. Priority levels may be preassigned in any manner, such as by prior user input. Priority levels may alternatively be automatically assigned by server 400 to, e.g., the meeting organizer, the user with the highest detected position or title, the most recent user to speak (e.g., frequent speakers may be given priority, or may conversely have their priority reduced to allow others the speak), or in any other manner.

Once a user is selected for speaking to the remaining users, the server 400 transmits the audio information of the selected audio source, or selected speaker, to each remaining user, i.e., each remaining device 420, 425, 430, including to each remaining audio source (Step 604). The remaining audio sources may be muted, e.g., the server 400 simply does not forward their audio streams to any other device 420, 425, 430. In this manner, users hear only the single selected audio source.

Speech-to-text module 504 of server 400 also translates or transcribes the audio information of each remaining audio stream to text (Step 606), such as by execution of known speech-to-text routines and processes encoded in memory 314. The transcribed text of each audio source (besides that of the selected speaker) is then transmitted for display to each user. As above, display may be as text visible to each user, as a chat bubble or some other extended reality object placed next to its corresponding avatar or other representation (Step 608). That is, each speaker besides the selected one has his or her words displayed in text form next to his or her avatar, for all other users to view.

The displayed text is associated with its corresponding avatar in any manner. For example, the text may be displayed proximate to or sufficiently near the avatar to clearly indicate its association. The text may also, or alternatively, be placed within an object that points to its avatar. Server 400 also generates the text for display in the extended reality environment of every device 420, 425, 430, facing each user. That is, within every extended reality environment, server 400 generates a text object for every transcribed audio stream, oriented to face that particular user. Furthermore, the collision detection and avoidance module 506 of server 400 continually adjusts the position of each object to maintain its position relative to each avatar, and to prevent or avoid collisions with other extended reality objects as shown in connection with FIGS. 2A-2C.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, speakers may be chosen for audio broadcast in any manner, and the transcribed text of remaining speakers may be displayed in any extended reality object. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of resolving conflicting communications in an extended reality environment, the method comprising:
   using control circuitry, receiving audio information from more than one audio source at the same time, each audio source having a corresponding representation in an extended reality environment;
   selecting one of the audio sources from the plurality of audio sources;
   transmitting the audio information of the selected audio source to each of the remaining audio sources;
   translating the audio information of each of the remaining audio sources to text; and
   transmitting the text of each of the remaining audio sources for display associated with the respective representations of each of the remaining audio sources.

2. The method of claim 1, wherein the display further comprises display of the text of each of the remaining audio sources as extended reality objects positioned proximate to the corresponding representations.

3. The method of claim 2, wherein the extended reality objects are positioned to display their text to the representations.

4. The method of claim 2, wherein the display further comprises display of the text of each of the remaining audio sources as one of the extended reality objects for each of the representations of each of the remaining audio sources, the extended reality objects facing their respective each representations.

5. The method of claim 2, wherein the extended reality objects are configured to be moved within the extended reality environment so as to avoid collisions with other objects of the extended reality environment.

6. The method of claim 2, wherein the extended reality objects are configured to remain positioned proximate to the corresponding representations as the corresponding representations are moved within the extended reality environment.

7. The method of claim 2, wherein the extended reality objects comprise chat bubbles.

8. The method of claim 1, wherein the selecting further comprises selecting the audio source corresponding to a first received one of the audio information.

9. The method of claim 1, further comprising assigning a priority level to each audio source, wherein the selecting further comprises selecting the audio source having the highest assigned priority level.

10. The method of claim 1, further comprising muting each of the remaining audio sources.

11. A system for resolving conflicting communications in an extended reality environment, the system comprising:
    a storage device; and
    control circuitry configured to:
       receive audio information from more than one audio source at the same time, each audio source having a corresponding representation in an extended reality environment;
       select one of the audio sources from the plurality of audio sources;
       transmit the audio information of the selected audio source to each of the remaining audio sources;
       translate the audio information of each of the remaining audio sources to text; and
       transmit the text of each of the remaining audio sources for display associated with the respective representations of each of the remaining audio sources.

12. The system of claim 11, wherein the display further comprises display of the text of each of the remaining audio sources as extended reality objects positioned proximate to the corresponding representations.

13. The system of claim 12, wherein the extended reality objects are positioned to display their text to the representations.

14. The system of claim 12, wherein the display further comprises display of the text of each of the remaining audio sources as one of the extended reality objects for each of the representations of each of the remaining audio sources, the extended reality objects facing their respective each representations.

15. The system of claim 12, wherein the extended reality objects are configured to be moved within the extended reality environment so as to avoid collisions with other objects of the extended reality environment.

16. The system of claim 12, wherein the extended reality objects are configured to remain positioned proximate to the corresponding representations as the corresponding representations are moved within the extended reality environment.

17. The system of claim 12, wherein the extended reality objects comprise chat bubbles.

18. The system of claim 11, wherein the selecting further comprises selecting the audio source corresponding to a first received one of the audio information.

19. The system of claim 11, wherein the control circuitry is further configured to assign a priority level to each audio source, and wherein the selecting further comprises selecting the audio source having the highest assigned priority level.

20. The system of claim 11, wherein the control circuitry is further configured to mute each of the remaining audio sources.

* * * * *